United States Patent
Hara et al.

(10) Patent No.: US 10,706,303 B2
(45) Date of Patent: Jul. 7, 2020

(54) DRIVER INFORMATION DETERMINATION APPARATUS

(71) Applicant: TOYOTA JIDOSHA KABUSHIKI KAISHA, Toyota-shi, Aichi-ken (JP)

(72) Inventors: Kenichiroh Hara, Yokohama (JP); Naruhisa Yoshida, Susono (JP); Kazuhiro Tomosue, Susono (JP); Hiroki Iida, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/503,734

(22) Filed: Jul. 5, 2019

(65) Prior Publication Data

US 2020/0050875 A1 Feb. 13, 2020

(30) Foreign Application Priority Data

Aug. 9, 2018 (JP) .................................. 2018-150132

(51) Int. Cl.
| | |
|---|---|
| *G08B 23/00* | (2006.01) |
| *G06K 9/00* | (2006.01) |
| *B60W 40/072* | (2012.01) |
| *G06F 3/01* | (2006.01) |
| *B60W 40/08* | (2012.01) |

(52) U.S. Cl.
CPC ....... *G06K 9/00845* (2013.01); *B60W 40/072* (2013.01); *B60W 40/08* (2013.01); *G06F 3/013* (2013.01); *B60W 2554/801* (2020.02)

(58) Field of Classification Search
CPC ............ G06K 9/00845; B60W 40/072; B60W 40/08; B60W 2550/308; G06F 3/013
See application file for complete search history.

(56) References Cited

U.S. PATENT DOCUMENTS

| | | | | |
|---|---|---|---|---|
| 2004/0193347 | A1* | 9/2004 | Harumoto | B60T 8/1755 701/45 |
| 2004/0252913 | A1* | 12/2004 | Ahn | G06F 1/1626 382/296 |
| 2006/0195241 | A1* | 8/2006 | Nakagoshi | B60W 40/06 701/45 |

(Continued)

FOREIGN PATENT DOCUMENTS

JP 4894572 B2 3/2012

*Primary Examiner* — Quang Pham
(74) *Attorney, Agent, or Firm* — Sughrue Mion, PLLC

(57) ABSTRACT

A driver information determination apparatus includes a road shape acquisition unit configured to acquire a front section shape ahead of a vehicle; a condition determination unit configured to determine whether the front section shape is a determination target shape; a face direction acquisition unit configured to acquire a face direction of a driver; and a reference face direction determination unit configured to determine a reference face direction based on the face direction of the driver. When it is determined that the front section shape is the determination target shape, the reference face direction determination unit determines the reference face direction based on the face direction of the driver. The determination target shape is a shape of a road having a road curvature less than or equal to a preset upper curvature limit or a shape of the road having a road incline within a preset level range.

4 Claims, 8 Drawing Sheets

(56) References Cited

U.S. PATENT DOCUMENTS

| | | | | |
|---|---|---|---|---|
| 2009/0115846 A1* | 5/2009 | Ohue | .................... | B60R 11/04 |
| | | | | 348/148 |
| 2013/0207805 A1* | 8/2013 | Inada | ................. | B60K 28/066 |
| | | | | 340/576 |
| 2016/0082970 A1* | 3/2016 | Jeon | .................... | B60W 10/18 |
| | | | | 477/97 |
| 2016/0107573 A1* | 4/2016 | Shin | ..................... | G02B 27/01 |
| | | | | 348/148 |
| 2016/0245658 A1* | 8/2016 | Niwa | .................... | G01C 21/32 |
| 2016/0263997 A1* | 9/2016 | Mizutani | ............. | B60W 40/076 |
| 2016/0327402 A1* | 11/2016 | Funabiki | ............... | B60W 40/02 |
| 2018/0074497 A1* | 3/2018 | Tsuji | .................. | G01C 21/3484 |
| 2018/0211535 A1* | 7/2018 | Mizuno | ........... | B60W 30/18145 |
| 2018/0264941 A1* | 9/2018 | Sato | ...................... | B60K 28/02 |
| 2019/0031207 A1* | 1/2019 | Nakamura | ............ | B60W 50/14 |
| 2019/0110729 A1* | 4/2019 | Yamataka | ............ | A61B 5/1495 |
| 2019/0370579 A1* | 12/2019 | Sugawara | ................. | G06T 7/20 |

\* cited by examiner

DRIVER INFORMATION DETERMINATION APPARATUS

TECHNICAL FIELD

The present disclosure relates to a driver information determination apparatus.

CROSS-REFERENCE TO RELATED APPLICATION

This application claims the benefit of priority from Japanese Patent Application No. 2018-150132, filed Aug. 9, 2018, the entire contents of which are incorporated herein by reference.

BACKGROUND

Japanese Patent No. 4894572 discloses an apparatus that determines a reference face direction which is a face direction when a driver faces frontward while driving a vehicle. The apparatus determines the reference face direction as an direction which a driver faces toward for a long time, based on a face direction of a driver when a vehicle travels forward, a change in the face direction of the driver is within a predetermined range, and a steering angle of a steering wheel of the vehicle is within a predetermined range.

SUMMARY

If a curved road or an inclined road such as an uphill road is present ahead of the vehicle, the driver may not see the front but the end of the curved road or the end of the inclined road. In this case, because the driver faces toward the end of the curved road or the end of the inclined road for a long time, the reference face direction may be determined as an direction deviated from the front of the driver.

An object of the present disclosure is to provide a driver information determination apparatus capable of accurately determining a reference face direction of a driver even when a curved road or an inclined road is present.

According to an aspect of the present disclosure, there is provided a driver information determination apparatus configured to determine a reference face direction that is a face direction when a driver faces frontward while driving a vehicle, the apparatus includes a road shape acquisition unit configured to acquire a shape of a road for a front section ahead of the vehicle; a condition determination unit configured to determine whether the shape of the road acquired by the road shape acquisition unit is a determination target shape; a face direction acquisition unit configured to acquire the face direction of the driver; and a reference face direction determination unit configured to determine the reference face direction based on the face direction of the driver acquired by the face direction acquisition unit, in which, when the condition determination unit determines that the shape of the road is the determination target shape, the reference face direction determination unit determines the reference face direction based on the face direction of the driver acquired by the face direction acquisition unit, and when the condition determination unit does not determine that the shape of the road is the determination target shape, the reference face direction determination unit does not determine the reference face direction based on the face direction of the driver acquired by the face direction acquisition unit, and in which the determination target shape is a shape of the road having a road curvature less than or equal to a preset upper curvature limit, or a shape of the road having a road incline within a preset level range.

The driver information determination apparatus determines the reference face direction based on a face direction of the driver when a road curvature for a front section ahead of the vehicle is less than or equal to the preset upper curvature limit, or a road incline for the front section ahead of the vehicle is within the preset level range. In other words, when determining the reference face direction, the driver information determination apparatus uses a face direction of the driver when the front section ahead of the vehicle is a straight road (road having a curvature less than or equal to the upper curvature limit) or a level road (road having an incline within the level range). In contrast, the driver information determination apparatus does not determine the reference face direction based on a face direction of the driver when a road curvature for the front section ahead of the vehicle is greater than the preset upper curvature limit or a road incline for the front section ahead of the vehicle is not within the preset level range. In other words, when determining the reference face direction, the driver information determination apparatus does not use a face direction of the driver when the front section ahead of the vehicle is a curved road or an inclined road. When the front section ahead of the vehicle is a straight road or a level road, the driver is highly likely to see the front. On the contrary, when the front section ahead of the vehicle is a curved road or an inclined road, the driver is highly likely to not see the front hut the end of the curved road or the end of the inclined road. Therefore, the driver information determination apparatus determines the reference face direction based on the face direction of the driver when the driver is highly likely to see the front, and does not determine the reference face direction based on the face direction of the driver when the driver is unlikely to see the front. As a result, the driver information determination apparatus can accurately determine the reference face direction of the driver even when a curved road or an inclined road is present.

In the driver information determination apparatus according to the aspect of the present disclosure, the determination target shape may be a shape of a road having a road curvature less than or equal to the upper curvature limit and a road incline within the level range. Accordingly, when the front section ahead of the vehicle is a straight and level road, the face direction of the driver is used to determine the reference face direction. In particular, when the front section ahead of the vehicle is a straight and level road, the driver is highly likely to see the front. Therefore, the driver information determination apparatus can more accurately determine the reference face direction of the driver.

The driver information determination apparatus according to the aspect of the present disclosure may further include a preceding vehicle determination unit configured to determine whether a preceding vehicle is present within a short-distance range ahead of the vehicle, in which, when the preceding vehicle determination unit determines that the preceding vehicle is present within the short-distance range ahead of the vehicle, regardless of whether the condition determination unit determines that the shape of the road is the determination target shape, the reference face direction determination unit may determine the reference face direction based on the face direction of the driver acquired by the face direction acquisition unit. Because the driver is more likely to watch the preceding vehicle when the preceding vehicle is present within the short-distance range ahead of the vehicle than when the preceding vehicle is not present within the short-distance range ahead of the vehicle, the driver is highly likely to see the preceding vehicle near the front even though the front section ahead of the vehicle is a curved road or an inclined road. When the preceding vehicle is present within the short-distance range ahead of the vehicle, regardless of whether the front section ahead of the vehicle is a curved road or an inclined road, the driver information determination apparatus uses the face direction of the driver in, the determination of the reference face direction. As a result, the driver information determination apparatus can have higher opportunities to acquire the face direction of the driver used in the determination of the reference face direction of the driver.

According to various aspects of the present disclosure, it is possible to accurately determine the reference face direction of the driver even when a curved road or an inclined road is present.

DETAILED DESCRIPTION

Hereinafter, an exemplary embodiment will be described with the drawings.

Figure 1:
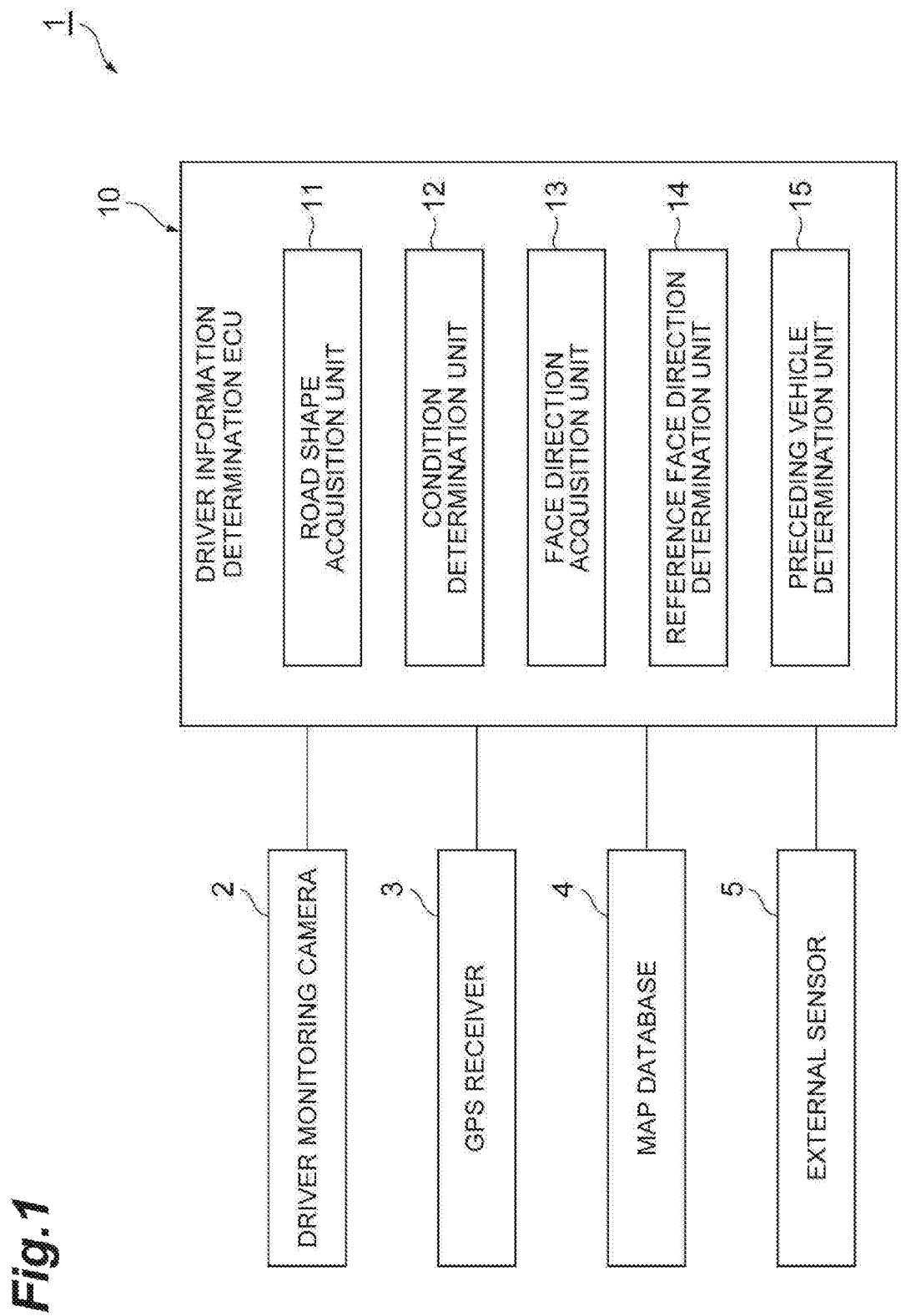
FIG. 1 shows a block diagram illustrating a driver information determination apparatus according to the present embodiment.
Figure 2:
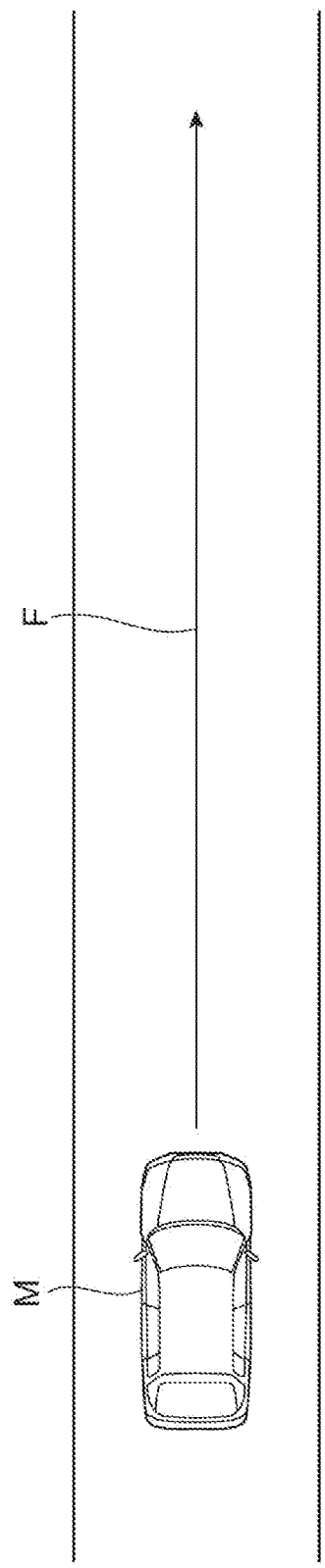
FIG. 2 shows a plan view illustrating a face direction of a driver on a straight road.
Figure 3:
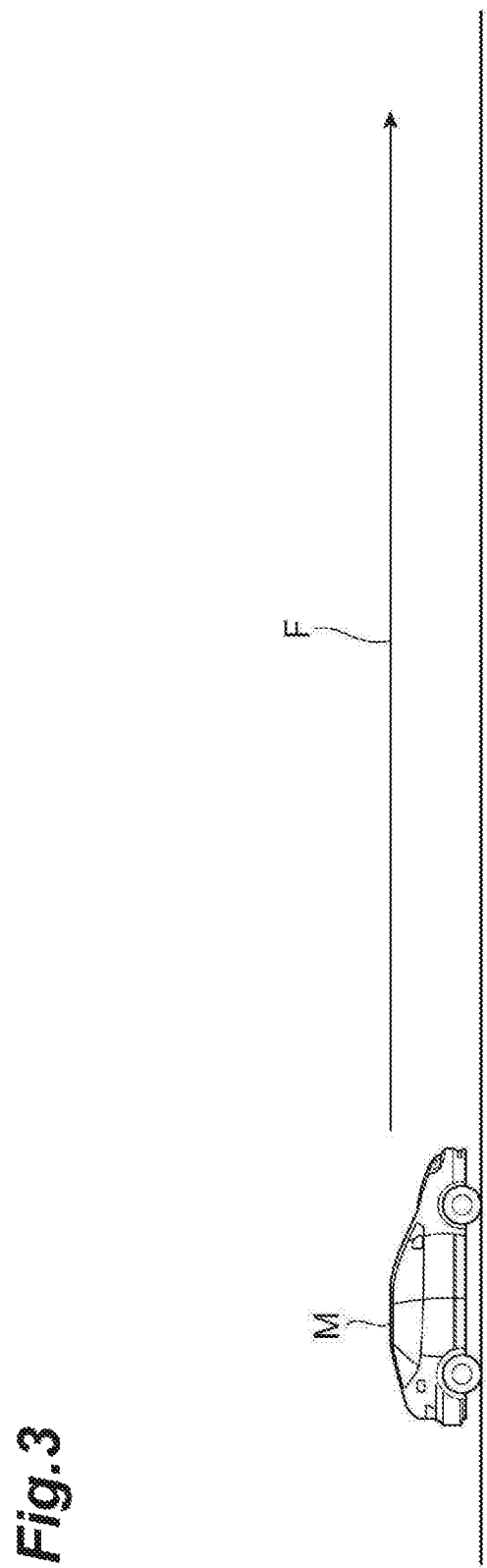
FIG. 3 shows a lateral view illustrating a face direction of a driver on a level road.
Figure 4:
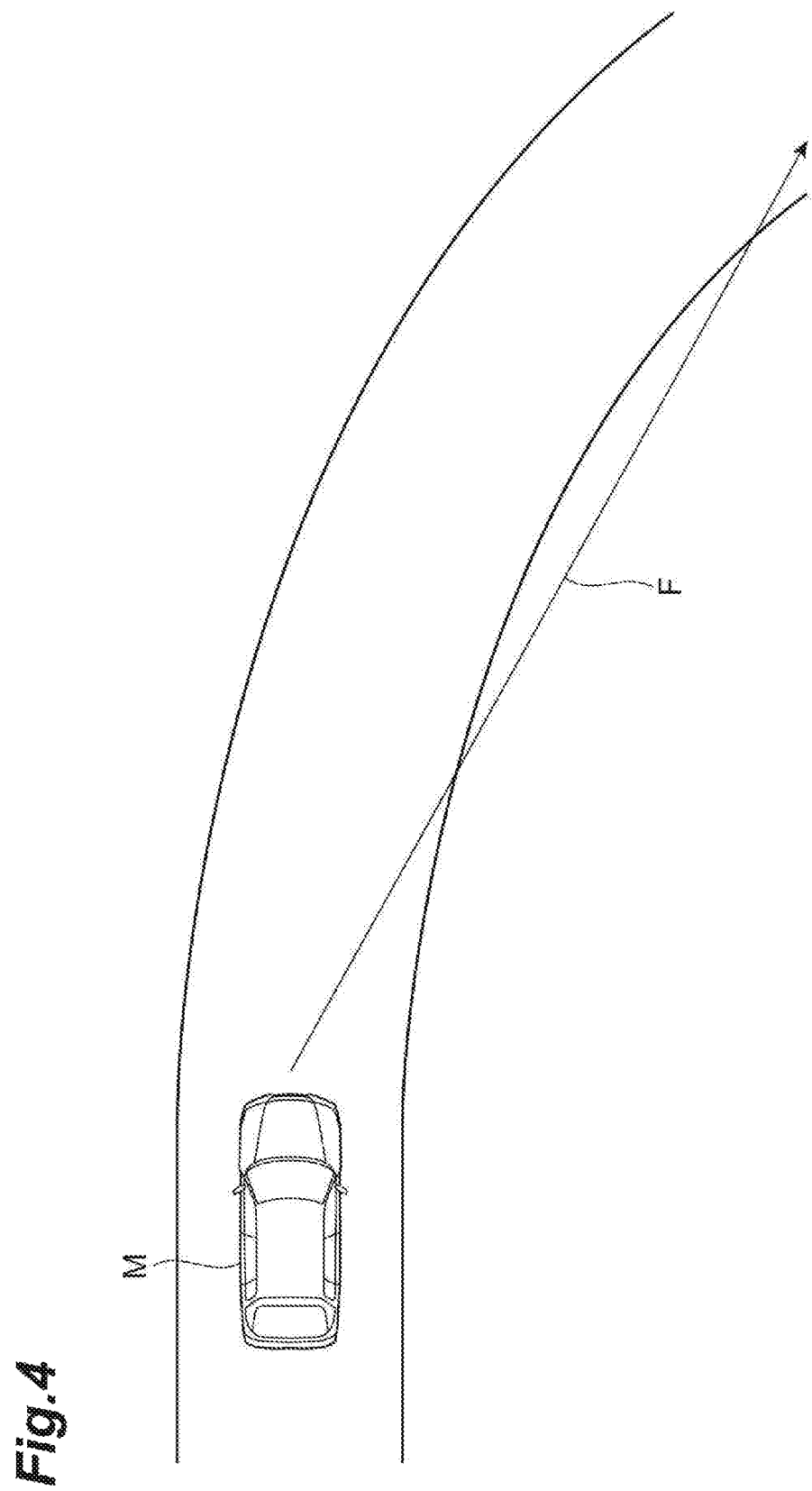
FIG. 4 shows a plan view illustrating a face direction of the driver on a curved road.
Figure 5:
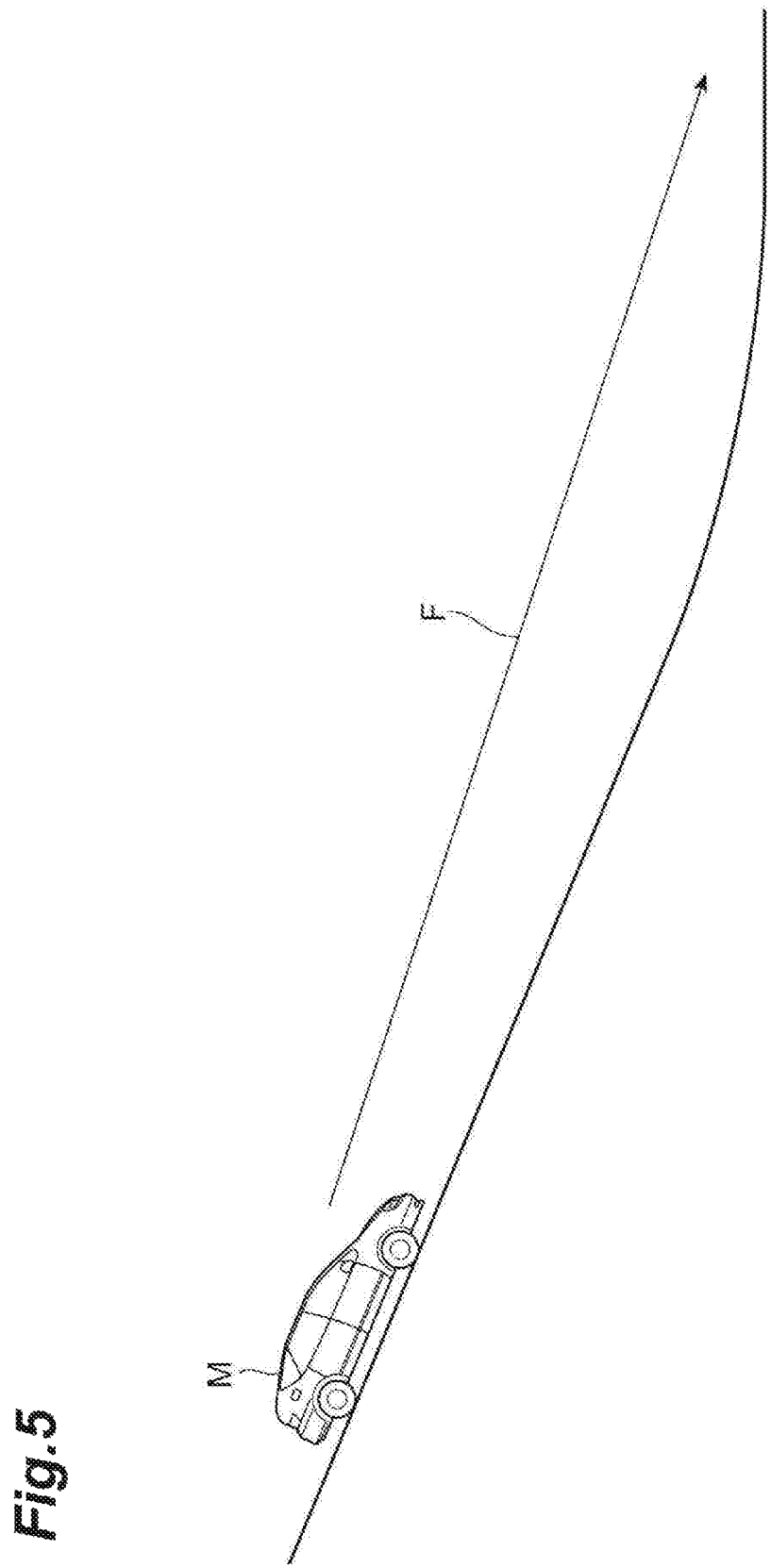
FIG. 5 shows a lateral view illustrating a face direction of the driver on an inclined road.

FIG. 1 shows a block diagram illustrating a driver information determination apparatus 1 according to the present embodiment. FIG. 2 shows a plan view illustrating a face direction F of a driver on a straight road. FIG. 3 shows a lateral view illustrating the face direction F of the driver on a level road. FIG. 4 shows a plan view illustrating the face direction F of the driver on a curved road. FIG. 5 shows a lateral view illustrating the face direction F of the driver on an inclined road. As illustrated in FIGS. 1 to 5, the driver information determination apparatus 1 is an apparatus that is installed on a vehicle M such as a passenger vehicle and determines a reference face direction of a driver. The "face direction" implies an direction which a driver's face is positioned toward. The "reference face direction" implies a face direction where a driver faces frontward while driving the vehicle M.

The driver information determination apparatus 1 includes a driver information determination electronic control unit (ECU) 10 that collectively controls the apparatus. The driver information determination ECU 10 is an electronic control unit that includes a central processing unit (CPU), a read only memory (RUM), a random access memory (RAM), etc. The driver information determination ECU 10 loads a program stored the ROM onto the RAM.

The driver information determination ECU 10 realizes each function related to a driver information determination process by executing the program loaded onto the RAM via the CPU. The driver information determination ECU 10 may be configured to include a plurality of ECUs. Some functions of the driver information determination ECU 10 may be executed by a server capable of communicating with the vehicle M.

The driver information determination ECU 10 is connected to a driver monitoring camera 2, a GPS receiver 3, a map database 4, and an external sensor 5.

The driver monitoring camera 2 is an imaging device that captures images of a driver. The driver monitoring camera 2 is provided in front of a driver on a steering column cover of the vehicle M, and at least captures images of a driver's face. A plurality of the driver monitoring camera 2 may be provided to capture images of a driver in a plurality of directions. The driver monitoring camera 2 transmits driver image information to the driver information determination ECU 10.

The GPS receiver 3 measures the position (for example, latitude and longitude of the vehicle M) of the vehicle M by receiving signals from 3 or more GPS satellites. The UPS receiver 3 transmits measured position information of the vehicle M to the driver information determination ECU 10.

The map database 4 is a database that stores map information. The map database 4 is embedded onto a hard disk drive (HUD) installed on the vehicle M. The map information includes position information of roads, road shape information (for example, road curvatures, types of straight or curved roads, road inclines, and types of level or inclined roads), position information of intersections, etc., and position information of structures. The map information may include traffic regulation information such as legal speeds related to position information. The map database 4 may not be necessarily installed on the vehicle M, but may be formed on a server capable of communicating with the vehicle M.

The external sensor 5 is a detection device that detects peripheral situations of the vehicle M. The external sensor 5 includes at least either of a camera or a radar sensor.

The camera is an imaging device that captures images of situations outside the vehicle M. The camera is provided on the back side of front glass of the vehicle M. The camera transmits image information regarding situations outside the vehicle M to the driver information determination ECU 10. The camera may be a monocular camera or a stereo camera. The stereo camera has two imaging units disposed to reproduce binocular parallax. Image information from the stereo camera also includes depth information.

The radar sensor detects objects, etc. in the periphery of the vehicle M using radio waves (for example, millimeter waves) and light. The radar sensor detects objects, etc. by transmitting radio waves or light toward the periphery of the vehicle and receiving radio waves or light reflected by objects, etc. The radar sensor transmits detected object information to the driver information determination ECU 10. The objects, etc. include moving objects such as pedestrians, bicycles, and other vehicles in addition to fixed objects such as guard rails and buildings. The moving objects include a preceding vehicle L (refer to FIGS. 6 and 7). A "preceding vehicle" implies a vehicle that travels ahead of the vehicle M within a predetermined distance range from the vehicle M. The preceding vehicle L may be a vehicle that travels in the same travel lane of the vehicle M.

The driver information determination ECU 10 has a road shape acquisition unit 11, a condition determination unit 12, a face direction acquisition unit 13, a reference face direction determination unit 14, and a preceding vehicle determination unit 15.

The road shape acquisition unit 11 acquires a shape of a road section (hereinafter, referred to as "front section shape") ahead of the vehicle M. More specifically; the road shape acquisition unit 11 acquires a curvature (hereinafter, referred to as "front section curvature") and an incline (hereinafter, referred to as "front section incline") of a road section ahead of the vehicle M based on map information including position information of the vehicle M received from the GPS receiver 3, and road shape information acquired from the map database 4. The "front section" implies a section that is present within the predetermined distance range from the vehicle M along the travel lane of the vehicle M. The predetermined distance range may be 50 m, 100 m, or 200 m.

The condition determination unit 12 determines whether a front section shape acquired by the road shape acquisition unit 11 is a determination target shape. The "determination target shape" implies a shape of a road where a driver is more likely to face frontward when a front section shape corresponds to the determination target shape than when the front section shape does not correspond to the determination target shape. More specifically, the determination target shape is a shape of a road having a front section curvature less than or equal to a preset upper curvature limit, and a front section incline within a preset level range. In other words, the condition determination unit 12 compares a front section curvature acquired by the road shape acquisition unit 11 with the upper curvature limit, and a front section incline acquired by the road shape acquisition unit 11, and based on the result of the comparison, determines whether a front section shape is the determination target shape.

The "upper curvature limit" implies a curvature that indicates whether a road is a straight road or a curved road. In other words, the "straight road" implies a road having a curvature less than or equal to the upper curvature limit, and the "curved road" implies a road having a curvature not less than or equal to the upper curvature limit (that is, greater than the upper curvature limit). The upper curvature limit is preset. The "level range" implies an incline range that indicates whether a road is a level road or an inclined road. In other words, the "level road" implies a road having an incline within the level range, and the "inclined road" implies a road having an incline out of the level range (that is, greater than or less than the level range). The level range is preset to a range including an incline of 0.

The face direction acquisition unit 13 acquires the face direction F of the driver. More specifically, the face direction acquisition unit 13 acquires the face direction F of the driver using well-known image processing technique based on driver image information received from the driver monitoring camera 2. The face direction acquisition unit 13 acquires angle information of the face direction F of the driver in each of a yaw angle direction and a pitch angle direction.

The reference face direction determination unit 14 determines the reference face direction based on the face direction F of the driver acquired by the face direction acquisition unit 13. More specifically, the reference face direction determination unit 14 determines the reference face direction based on the face direction F of the driver acquired during a determination target period in the period from the past to the present time. The "determination target period" implies a period where a driver is highly likely to face frontward while driving the vehicle M, and the face direction F of the driver is used to determine the reference face direction in the period. The determination target period will be described in detail later.

The reference face direction determination unit 14 may determine the reference face direction by taking an average value of angles of the face direction F of the driver acquired during the determination target period as an angle of the reference face direction. The reference face direction determination unit 14 may take an average value of angles of the face direction F of the driver in the yaw angle direction acquired during the determination target period as an angle of the reference face direction in the yaw angle direction, and may take an average value of angles of the face direction F of the driver in the pitch angle direction acquired during the determination target period as an angle of the reference face direction in the pitch angle direction. The reference face direction determination unit 14 may determine the reference face direction using a median or a mode of the face direction F of the driver instead of an average value of the face direction F of the driver.

The preceding vehicle determination unit 15 determines whether the preceding vehicle L is present within a short-distance range ahead of the vehicle M. The "short-distance range" implies a range of a preset relatively short distance from the vehicle M. The short-distance range is set to a distance range where the preceding vehicle L within the short-distance range is highly likely to be positioned near the front of a driver even though a road within the short-distance range ahead of the vehicle M is a curved road or an inclined road. The short-distance range may be set to a distance range where the vehicle M can travel to follow the preceding vehicle L when a driver manually drives the vehicle M or the vehicle M is autonomously driven by an autonomous driving system, etc. The short-distance range may be a distance between 0 m and 50 m, 0 m and 100 m, or 0 m and 200 m from the front of the vehicle M.

Figure 6:
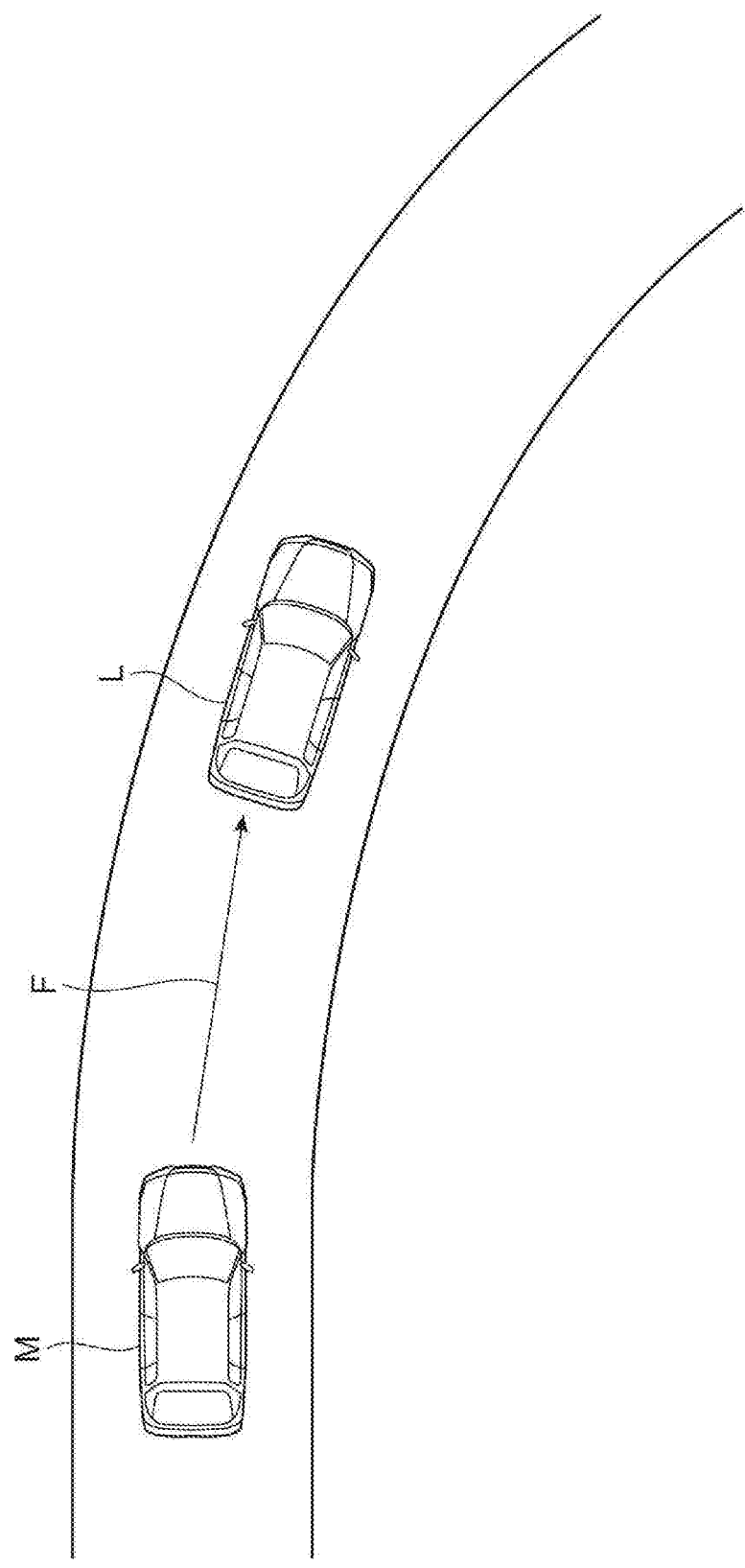
FIG. 6 shows a plan view illustrating a face direction of the driver when a preceding vehicle is present on a curved road.
Figure 7:
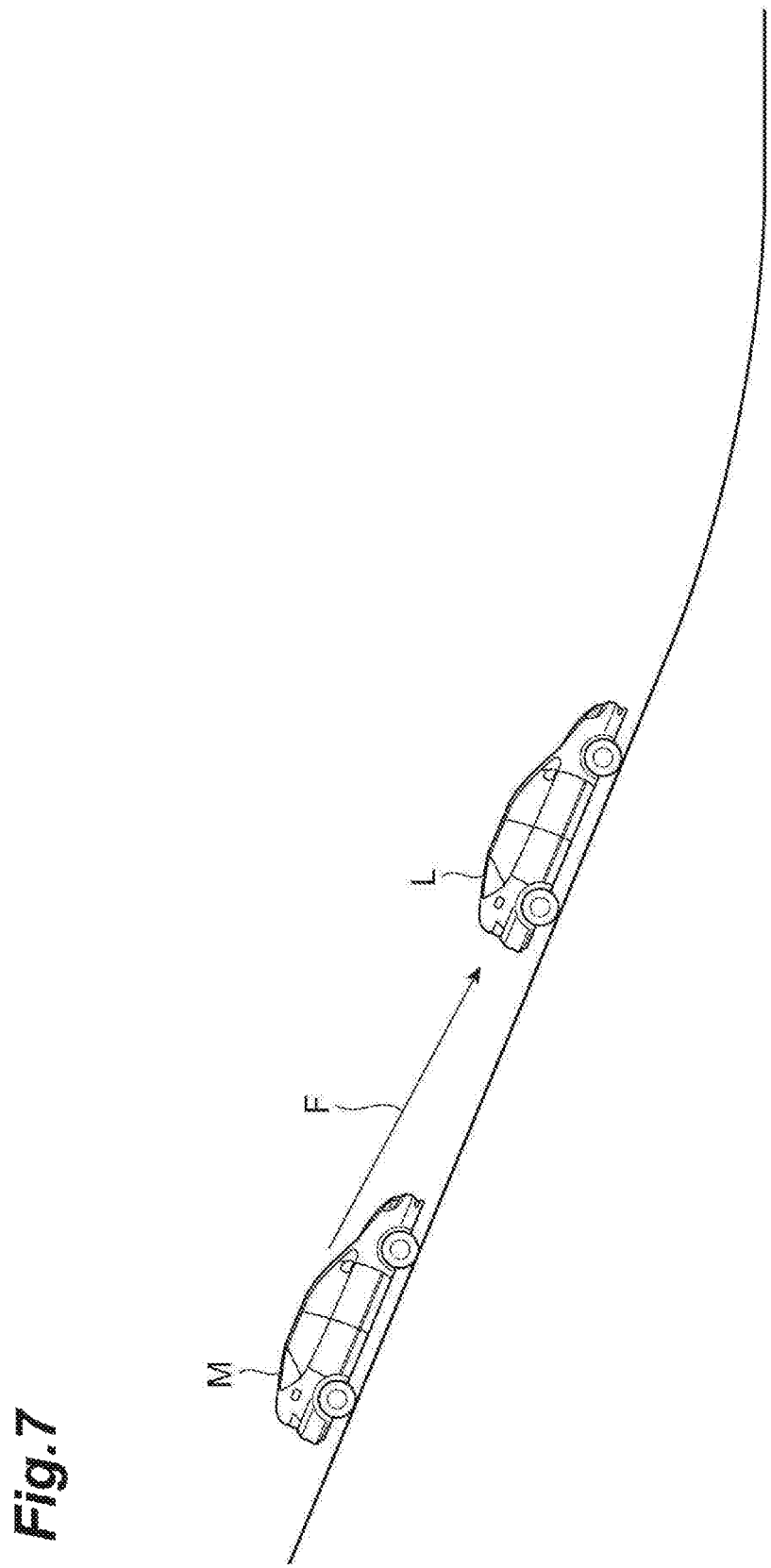
FIG. 7 shows a lateral view illustrating a face direction of the driver when a preceding vehicle is present on an inclined road.

FIG. 6 is a plan view illustrating the face direction F of the driver when the preceding vehicle L is present on a curved road. FIG. 7 is a lateral view illustrating the face direction F of the driver when the preceding vehicle L is present on an inclined road. As illustrated in FIGS. 1, 6, and 7, the preceding vehicle determination unit 15 determines whether the preceding vehicle L is present ahead of the vehicle M based on information received from the external sensor 5. The preceding vehicle determination unit 15 may determine whether the preceding vehicle L is present ahead of the vehicle M using well-known image processing technique based on image information regarding situations outside the vehicle Ni received from the camera. Alternatively, the preceding vehicle determination unit 15 may determine whether the preceding vehicle L is present ahead of the vehicle M based on information regarding objects in the periphery of the vehicle M received from the radar sensor.

Hereinafter, the determination target period will be described in detail with reference to the drawings. Firstly, regardless of whether the condition determination unit 12 determines that a front section shape acquired by the road shape acquisition unit 11 is the determination target shape, the determination target period is defined as a period where the preceding vehicle determination unit 15 determines that the preceding vehicle L is present ahead of the vehicle M (refer to FIGS. 6 and 7).

The determination target period is defined as a period where the condition determination unit 12 determines that a front section shape is the determination target shape in a period where the preceding vehicle determination unit 15 does not determine that the preceding vehicle L is present ahead of the vehicle M. In other words, the determination target period is defined as a period where a front section is a straight road and the front section is a level road (refer to FIGS. 2 and 3).

In contrast, the determination target period is not defined as a period where the condition determination unit 12 does not determine that a front section shape is the determination target shape in a period where the preceding vehicle determination unit 15 does not determine that the preceding vehicle L is present ahead of the vehicle M. In other words, the determination target period is not defined as a period where a front section is a curved road, and a period where a front section is an inclined road (refer to FIGS. 4 and 5).

Therefore, when the preceding vehicle determination unit 15 determines that the preceding vehicle L is present ahead of the vehicle M (determination target period), the reference face direction determination unit 14 determines the reference face direction based on the face direction F of the driver acquired by the road shape acquisition unit 11 regardless of whether the condition determination unit 12 determines that a front section shape is the determination target shape.

When the preceding vehicle determination unit 15 does not determine that the preceding vehicle L is present ahead of the vehicle M, and the condition determination unit 12 determines that a front section shape is the determination target shape (determination target period), the reference face direction determination unit 14 determines the reference face direction based on the face direction F of the driver acquired by the face direction acquisition unit 13.

In contrast, when the preceding vehicle determination unit 15 does not determine that the preceding vehicle L is present ahead of the vehicle M, and the condition determination unit 12 does not determine that a front section shape is the determination target shape (not in the determination target period), the reference face direction determination unit 14 does not determine the reference face direction based on the face direction F of the driver acquired by the face direction acquisition unit 13.

Figure 8:
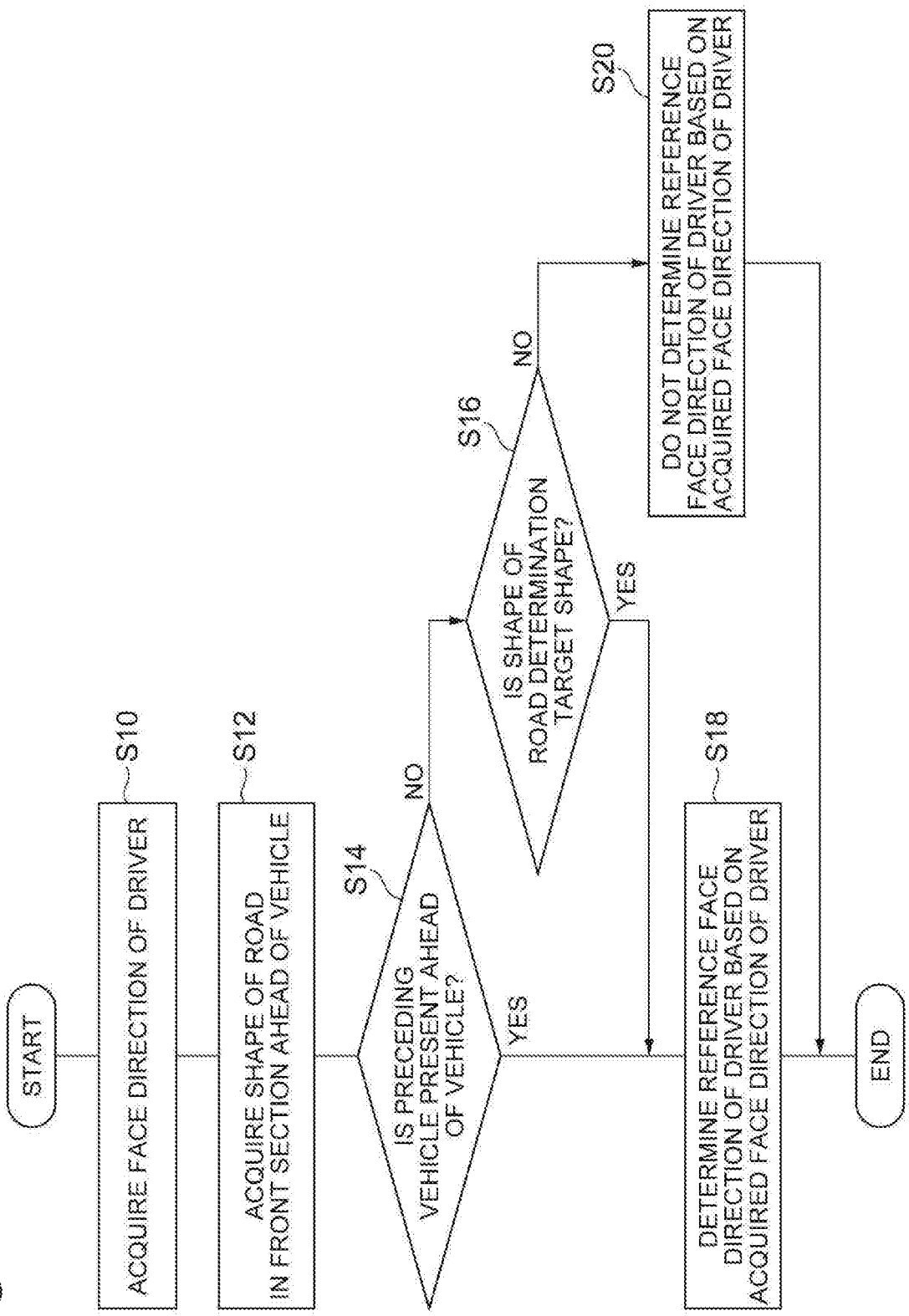
FIG. 8 shows a flowchart illustrating a driver information determination process.

Subsequently, a driver information determination process performed by the driver information determination apparatus 1 will be described. FIG. 8 is a flowchart illustrating the driver information determination process. The flowchart in FIG. 8 starts when the speed of the vehicle M becomes greater than or equal to a preset speed.

As illustrated in FIG. 8, in Step S10, the driver information determination apparatus 1 instructs the face direction acquisition unit 13 to acquire the face direction F of the driver using well-known image process technique based on driver image information received from the driver monitoring camera 2. Then, the driver information determination apparatus 1 proceeds to Step S12.

In Step S12, the driver information determination apparatus 1 instructs the road shape acquisition unit 11 to acquire a front section shape (front section curvature and front section incline) ahead of the vehicle M based on map information including position information of the vehicle M received from the GPS receiver 3 and road shape information acquired from the map database 4. Then, the driver information determination apparatus 1 proceeds to Step S14.

In Step S14, the driver information determination apparatus 1 instructs the preceding vehicle determination unit 15 to determine whether the preceding vehicle L is present ahead of the vehicle M based on information received from the external sensor 5. When it is determined that the preceding vehicle L is present ahead of the vehicle M (Step S14: YES), the driver information determination apparatus 1 proceeds to Step S18. In contrast, when it is not determined that the preceding vehicle L is present ahead of the vehicle M (Step S14: NO), the driver information determination apparatus 1 proceeds to Step S16.

In Step S16, the driver information determination apparatus 1 instructs the condition determination unit 12 to compare the front section curvature with an upper curvature limit, and the front section incline with a level range. The driver information determination apparatus 1 instructs the condition determination unit 12 to determine whether the front section shape is a determination target shape based on the result of the comparison. When the front section curvature is less than or equal to a preset upper curvature limit and the front section incline is within a preset level range, the condition determination unit 12 determines that the front section shape is the determination target shape. When it is determined that the front section shape is the determination target shape (Step S16: YES), the driver information determination apparatus 1 proceeds to Step S18. In contrast, when it is not determined that the front section shape is the determination target shape (Step S16: NO), the driver information determination apparatus 1 proceeds to Step S20.

In Step S18, the driver information determination apparatus 1 instructs the reference face direction determination unit 14 to determine the reference face direction based on the face direction F of the driver acquired during a determination target period by the face direction acquisition unit 13. Accordingly, the driver information determination apparatus 1 ends a present driver information determination process, and re-executes the driver information determination process at Step S10.

In Step S20, the driver information determination apparatus 1 instructs the reference face direction determination unit 14 not to determine a reference face direction based on the face direction F of the driver acquired by the face direction acquisition unit 13. The driver information determination apparatus 1 may not determine the reference face direction based on the face direction F of the driver at the present time not corresponding to a determination target period, but may take a reference face direction already determined based on the face direction F of the driver acquired in a past determination target period as a reference face direction at the present time. Accordingly, the driver information determination apparatus 1 ends the current driver information determination process, and re-executes the driver information determination process at Step S10.

As described above, the driver information determination apparatus 1 determines the reference face direction based on the face direction F of the driver when a front section curvature ahead of the vehicle M is less than or equal to the preset upper curvature limit or when a front section incline ahead of the vehicle M is within the preset level range. In other words, when determining the reference face direction, the driver information determination apparatus 1 uses the face direction F of the driver when a front section ahead of the vehicle M is a straight road or a level road. In contrast, the driver information determination apparatus 1 does not determine the reference face direction based on the face direction F of the driver when a front section curvature ahead of the vehicle M is greater than the preset upper curvature limit or a front section incline ahead of the vehicle M is not within the preset level range. In other words, when determining the reference face direction, the driver information determination apparatus 1 does not use the face direction F of the driver when a front section ahead of the vehicle M is a curved road or an inclined road. When the front section ahead of the vehicle M is a straight road or a level road, the driver is highly likely to see the front. On the contrary, when the front section ahead of the vehicle M is a curved road or an inclined road, the driver is highly likely to not see the front but the end of the curved road or the end of the inclined road. Therefore, the driver information determination apparatus 1 determines the reference face direction based on the face direction F of the driver when the driver is highly likely to see the front, and does not determine the reference face direction based on the face direction F of the driver when the driver is unlikely to see the front. As a result, the driver information determination apparatus 1 can accurately determine the reference face direction of the driver even when a curved road or an inclined road is present.

In the driver information determination apparatus 1, the determination target shape is a shape of a road having a front section curvature less than or equal to the upper curvature limit and a front section incline within the level range. Accordingly, when the front section ahead of the vehicle M is a straight and level road, the face direction F of the driver is used to determine the reference face direction. In particular, when the front section ahead of the vehicle M is a straight and level road, the driver is highly likely to see the front. Therefore, the driver information determination apparatus 1 can more accurately determine the reference face direction of the driver.

The driver information determination apparatus 1 includes the preceding vehicle determination unit 15 that determines whether the preceding vehicle L is present within the short-distance range ahead of the vehicle M. When the preceding vehicle determination unit 15 determines that the preceding vehicle L is present within the short-distance range ahead of the vehicle M, regardless of whether the condition determination unit 12 determines that a front section shape is the determination target shape, the reference face direction determination unit 14 determines the reference face direction based on the face direction F of the driver acquired by the face direction acquisition unit 13. Because the driver is more likely to watch the preceding vehicle L when the preceding vehicle L is present within the short-distance range ahead of the vehicle M than when the preceding vehicle L is not present within the short-distance range ahead of the vehicle M, the driver is highly likely to see the preceding vehicle L near the front even though the front section ahead of the vehicle M is a curved road or an inclined road. When the preceding vehicle L is present within the short-distance range ahead of the vehicle M, regardless of whether the front section ahead of the vehicle M is a curved road or an inclined road, the driver information determination apparatus uses the face direction F of the driver in the determination of the reference face direction. As a result, the driver information determination apparatus 1 can have higher opportunities to acquire the face direction F of the driver used in the determination of the reference face direction of the driver.

The aforementioned embodiment can be realized in various changes or improved forms based on knowledge of those skilled in the related art.

In the embodiment, the determination target shape may be a shape of a road having a front section curvature less than or equal to the preset upper curvature limit or a shape of a road having a front section incline within the preset level range. In other words, the determination target shape may be a shape of a road having a front section curvature less than or equal to the preset upper curvature limit regardless of a front section incline. Alternatively, the determination target shape may be a shape of a road having a front section incline within the preset level range regardless of a front section curvature. Accordingly, it is possible to have higher opportunities to acquire the face direction F of the driver used in the determination of the reference face direction of the driver than when the determination target shape is a shape of a road having a front section curvature less than or equal to the upper curvature limit and a front section incline within the level range.

In the embodiment, technique for the road shape acquisition unit 11 to acquire a front section shape is not particularly limited. In other words, the road shape acquisition unit 11 may not acquire a front section curvature and a front section incline based on map information including position information of the vehicle M received from the GPS receiver 3, and road shape information acquired from the map database 4. The road shape acquisition unit 11 may acquire a front section shape based on image information received from the camera of the external sensor 5, or may acquire a front section shape based on information regarding objects in the periphery of the vehicle M received from the radar sensor of the external sensor 5. Alternatively, the road shape acquisition unit 11 may acquire a road curvature at the current position of the vehicle M based on yaw rate information received from a yaw rate sensor installed on the vehicle M, and estimate a front section curvature based on the acquired road curvature. The road shape acquisition unit 11 may acquire a road incline at the current position of the vehicle M based on slope angle information received from a slope angle sensor installed on the vehicle M, and estimate a front section incline based on the acquired road incline.

In the embodiment, even though the preceding vehicle L is present within the short-distance range ahead of the vehicle M, when the condition determination unit 12 determines that a front section shape is the determination target shape, the reference face direction determination unit 14 may determine the reference face direction based on the face direction F of the driver. Even though the preceding vehicle L is present within the short-distance range ahead of the vehicle M, when the condition determination unit 2 does not determine that a front section shape is the determination target shape, the reference face direction determination unit 14 may not determine the reference face direction based on the face direction F of the driver. In this case, the driver information determination apparatus 1 may not include the preceding vehicle determination unit 15. The driver information determination apparatus 1 may not determine whether the preceding vehicle L is present within the short-distance range ahead of the vehicle M.

FIGS. 5 and 7 illustrate inclined roads having a descending incline, but an inclined mad may have an ascending incline. A front section ahead of the vehicle M may be an inclined road, and the vehicle M may be currently positioned on a level road. Similarly, with regard to curved roads illustrated in FIGS. 4 and 6, a front section ahead of the vehicle M may be a curved road, and the vehicle M may be currently positioned on a straight road.

What is claimed is:
1. A driver information determination apparatus to determine a reference face direction that is a face direction when a driver faces frontward while driving a vehicle, the apparatus comprising:
    a road shape acquisition unit to acquire a shape of a road for a front section ahead of the vehicle;
    a condition determination unit to determine whether the shape of the road acquired by the road shape acquisition unit is a determination target shape;
    a face direction acquisition unit to acquire the face direction of the driver; and a reference face direction determination unit to determine the reference face direction based on the face direction of the driver acquired by the face direction acquisition unit, wherein, when the condition determination unit determines that the shape of the road is the determination target shape, the reference face direction determination unit determines the reference face direction based on the face direction of the driver acquired by the face direction acquisition unit, and when the condition determination unit does not determine that the shape of the road is the determination target shape, the reference face direction determination unit does not determine the reference face direction based on the face direction of the driver acquired by the face direction acquisition unit, and wherein the determination target shape is a shape of the road having a road curvature less than or equal to a preset upper curvature limit, or the shape of the road having a road incline within a preset level range.

2. The driver information determination apparatus according to claim 1, wherein the determination target shape is the shape of the road having the road curvature less than or equal to the upper curvature limit and the road incline within the level range.

3. The driver information determination apparatus according to claim 1, further comprising:

a preceding vehicle determination unit to determine whether a preceding vehicle is present within a short-distance range ahead of the vehicle, wherein, when the preceding vehicle determination unit determines that the preceding vehicle is present within the short-distance range ahead of the vehicle, regardless of whether the condition determination unit determines that the shape of the road is the determination target shape, the reference face direction determination unit determines the reference face direction based on the face direction of the driver acquired by the face direction acquisition unit.

4. The driver information determination apparatus according to claim 2, further comprising:

a preceding vehicle determination unit to determine whether a preceding vehicle is present within a short-distance range ahead of the vehicle, wherein, when the preceding vehicle determination unit determines that the preceding vehicle is present within the short-distance range ahead of the vehicle, regardless of whether the condition determination unit determines that the shape of the road is the determination target shape, the reference lace direction determination unit determines the reference face direction based on the face direction of the driver acquired by the face direction acquisition unit.

* * * * *